(No Model.)
J. H. LYNCH.
CIRCULAR SAW ROUNDER.
No. 523,078. Patented July 17, 1894.
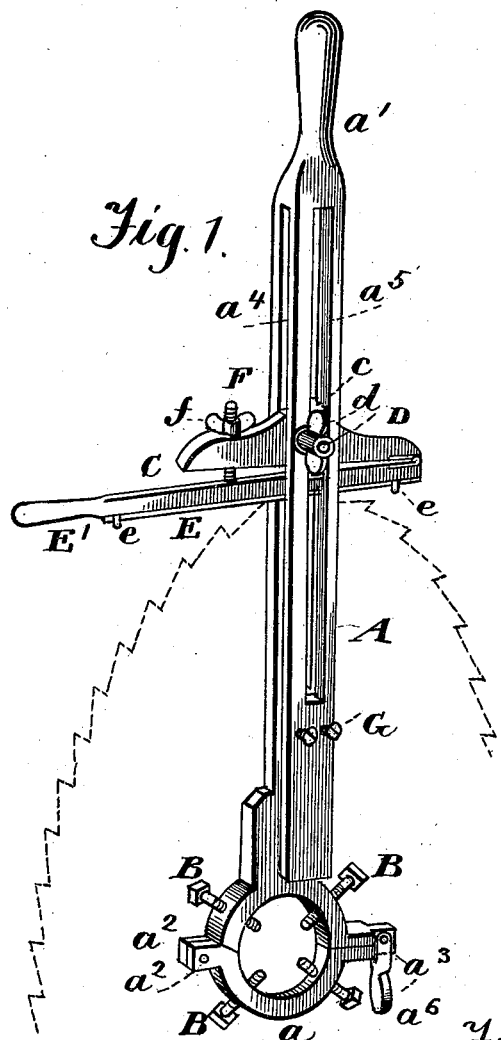
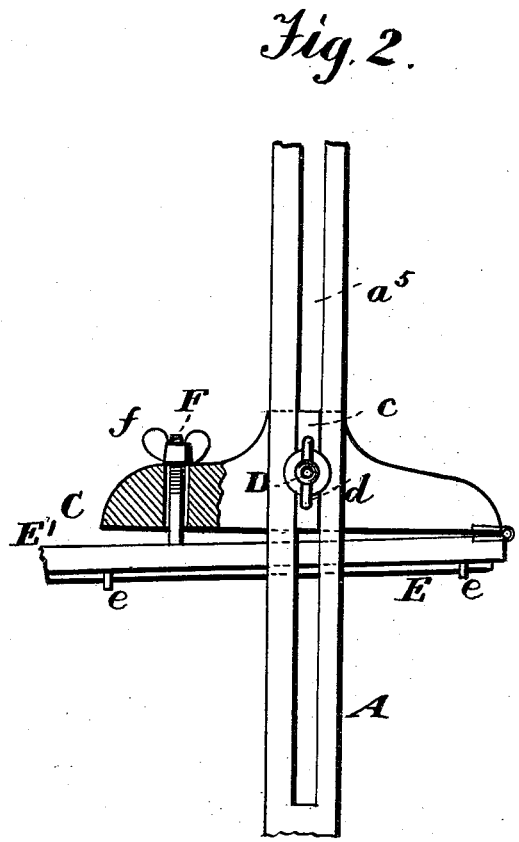
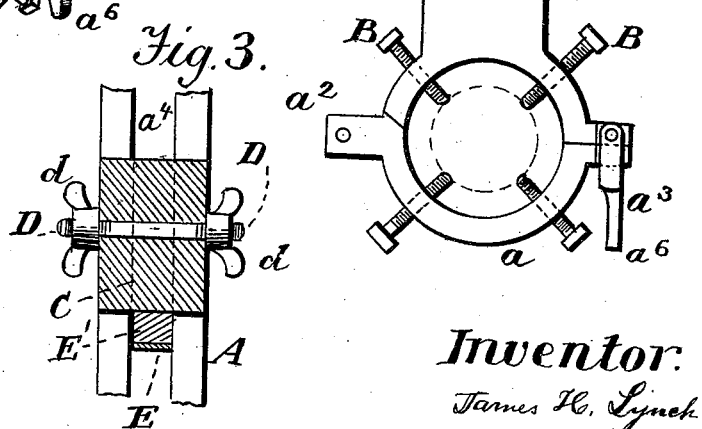
Witnesses
A. Ruppert
G. B. Towles
Inventor:
James H. Lynch
Per
Thomas P. Simpson
Atty

UNITED STATES PATENT OFFICE.

JAMES H. LYNCH, OF WESTMORELAND COUNTY, PENNSYLVANIA.

CIRCULAR-SAW ROUNDER.

SPECIFICATION forming part of Letters Patent No. 523,078, dated July 17, 1894.

Application filed October 20, 1893. Serial No. 488,823. (No model.)

*To all whom it may concern:*

Be it known that I, JAMES H. LYNCH, a citizen of the United States, residing in the county of Westmoreland and State of Pennsylvania, have invented certain new and useful Improvements in Saw-Rounders; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to "round" the teeth of a circular saw and keep the working faces, as nearly as possible, in a true circle.

Figure 1 of the drawings is an elevation in perspective and Fig. 2 a side-elevation, partly broken away; Fig. 3 a detail view of the clamp screw, studs and fly-nuts.

In the drawings, A represents the frame with the clamp $a$ at the lower end, the handle $a'$ at the upper end, and the intermediate slots $a^4$ $a^5$ at right angles to each other. The clamp $a$ is made in two semi-circular sections, with the flanges $a^2$ $a^2$ connected by a pivot and the flanges $a^3$ $a^3$ by a loop fastener $a^6$ pivoted to the upper flange. B are set screws arranged on and passing through the periphery of the clamp so as to hold sawshafts which differ in size. It will be perceived that the slot $a^4$ is open at the lower end, to allow the convenient insertion or removal of the saw, while it is adapted to receive the file-holder C above the saw, the said holder being provided with the opposite studs $c$ $c$ which work up and down in the slots $a^5$ $a^5$.

D is a clampbolt threaded at both ends to receive the fly-nuts $d$ $d$ and thus hold the file at any desired adjustment, the bolt being made to pass through the studs.

E is a flat file secured at each end by a V-bolt or staple $e$ to the handle E', the latter being hinged in front to the holder C.

To the handle E' is made fast the lower end of a bolt F which passes through the fileholder C and is provided, on its upper threaded end with a fly-nut $f$ so that the file may be adjusted with exactness in relation to the teeth of the saw.

G represent screws which may be employed to hold the blade rigidly in place but they are not absolutely necessary.

My file-holder, with its attachments, is equally adapted to "round" the teeth of a circular saw, whether they are integral or fastened in place.

The operation is as follows: The fileholder handle is taken in one hand and that of the "rounder" in the other, the former being pushed back and forth while the latter is firmly held in position. This is continued until the working faces of all the teeth are brought in the same circular line.

Having thus described my invention, what I claim as new, and desire to protect by Letters Patent, is—

A saw rounder consisting of a frame with a shaft-clamp at the lower end, a handle at the upper end and the intermediate slots $a^4$ $a^5$, the fileholder C having opposite stud $c$ $c$, the clampbolt D having a fly-nut on each threaded end a handle E hinged to the front end of the fileholder, the said handle E adapted to carry on its under side, a flat file as shown and described.

In testimony whereof I affix my signature in presence of two witnesses.

JAMES H. LYNCH.

Witnesses:
J. M. SPRINGER,
JAMES PATTERSON.